(12) United States Patent
Moretto

(10) Patent No.: US 6,677,540 B1
(45) Date of Patent: Jan. 13, 2004

(54) SCALE FOR WEIGHING PEOPLE

(75) Inventor: Maurizio Moretto, Barbarano Vicentino (IT)

(73) Assignee: Laica S.r.l., Vicentino (IT)

( * ) Notice: Subject to any disclaimer, the term of this patent is extended or adjusted under 35 U.S.C. 154(b) by 0 days.

(21) Appl. No.: 09/744,443

(22) PCT Filed: May 3, 1999

(86) PCT No.: PCT/EP99/02986

§ 371 (c)(1),
(2), (4) Date: Apr. 9, 2001

(87) PCT Pub. No.: WO00/06978

PCT Pub. Date: Feb. 10, 2000

(30) Foreign Application Priority Data

Jul. 28, 1998 (IT) ........................................ PD980083 U
Nov. 4, 1998 (EP) ............................................ 98203715

(51) Int. Cl.[7] ............................................... G01G 21/08
(52) U.S. Cl. ..................................................... 177/256
(58) Field of Search .............................. 177/256, 257, 177/258, 259

(56) References Cited

U.S. PATENT DOCUMENTS

| | | | |
|---|---|---|---|
| 2,960,329 A | * | 11/1960 | Hanssen ..................... 177/246 |
| 3,811,523 A | * | 5/1974 | Artwick ....................... 177/180 |
| 4,458,771 A | * | 7/1984 | Hanssen et al. ............. 177/256 |
| 4,893,685 A | * | 1/1990 | Bergman et al. ............ 177/174 |
| 5,219,030 A | * | 6/1993 | Mordick ...................... 177/256 |
| 5,801,338 A | * | 9/1998 | Williamson .................. 177/256 |
| 5,955,705 A | * | 9/1999 | Germanton .................. 177/262 |

FOREIGN PATENT DOCUMENTS

| | | |
|---|---|---|
| CH | 268 894 A | 9/1950 |
| CH | 427 324 A | 6/1967 |
| DE | 23 64 293 A | 6/1975 |
| DE | 91 12 955 U | 12/1991 |
| WO | WO 97 21078 A | 6/1997 |

* cited by examiner

Primary Examiner—Randy Gibson
(74) Attorney, Agent, or Firm—Sughrue Mion, PLLC

(57) ABSTRACT

Personal weighing scales comprise a load platform (2) made of a plate-like material, a mechanism (4) for measuring the load bearing on the platform (2), a frame (3) for supporting the mechanism, and support devices in the form of appendages (15) fixed to the load platform (2) on the side facing the mechanism and bearing on the mechanism in order to transmit thereto the load bearing on the platform (2); connectors between the platform and the frame comprise at least one elongate element (16a, 16b) having a first end connected to the frame (3) and a second, opposite end connected directly to the corresponding appendage (15) so as to prevent detachment of the load platform (2) from the frame (3).

11 Claims, 3 Drawing Sheets

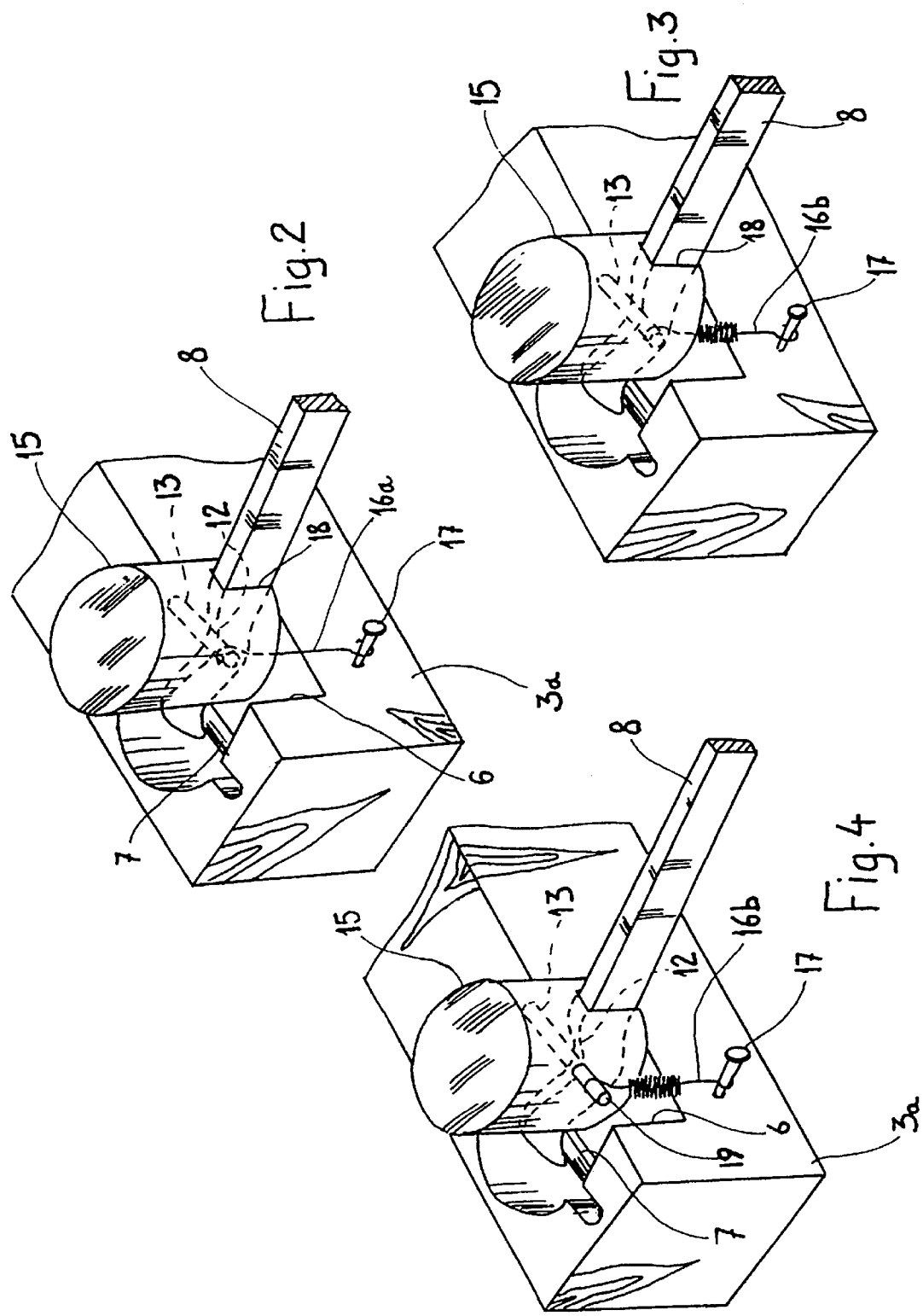

SCALE FOR WEIGHING PEOPLE

TECHNICAL FIELD

This is a National Stage Entry of Application No. PCT/EP99/02986 filed May 3, 1999; the disclosure of which is incorporated herein by reference.

The present invention relates to personal weighing scales of the type which is the subject of the preamble to main claim 1.

BACKGROUND ART

Within this field, the invention is suitable optimally but not exclusively for the production of a set of scales with a transparent load platform, a wooden frame, and a mechanical weighing device which is visible, together with the frame, through the load platform.

With scales having this structure, a problem arises in connecting the load platform to the frame in a manner such that these two elements are fixed firmly together but are capable of the very small relative movements which are necessary for the operation of the weighing mechanism. Typically, a small movement of the load platform takes place towards the frame, under load.

A known solution which has been adopted by the Applicant up to now is that of providing a metal rod which interconnects a pair of adjacent appendages (another rod is provided symmetrically for the remaining pair of appendages) and a corresponding metal rod, parallel thereto and fixed in the frame. The two rods are interconnected in an approximately central position by a spring which achieves the required connection.

However, this device requires both the frame and the appendages to be prepared for the fixing of the two pairs of rods and also greatly affects the appearance of the scales from an aesthetic point of view.

DISCLOSURE OF INVENTION

The object of the invention is to provide scales which are designed structurally and functionally so as to prevent all of the problems complained of with reference to the prior art mentioned.

This problem is solved by the invention by means of scales formed in accordance with the following claims.

BRIEF DESCRIPTION OF DRAWINGS

The characteristics and the advantages of the invention will become clearer from the following detailed description of a preferred embodiment thereof, described by way of non-limiting example with reference to the appended drawings, in which:

FIG. 2 is a perspective view of a detail of the scales of FIG. 1,

FIG. 3 is a variant of the detail of FIG. 2,

FIG. 4 is a further variant of the detail of FIG. 2,

BEST MODE FOR CARRYING OUT THE INVENTION

Figure 1:
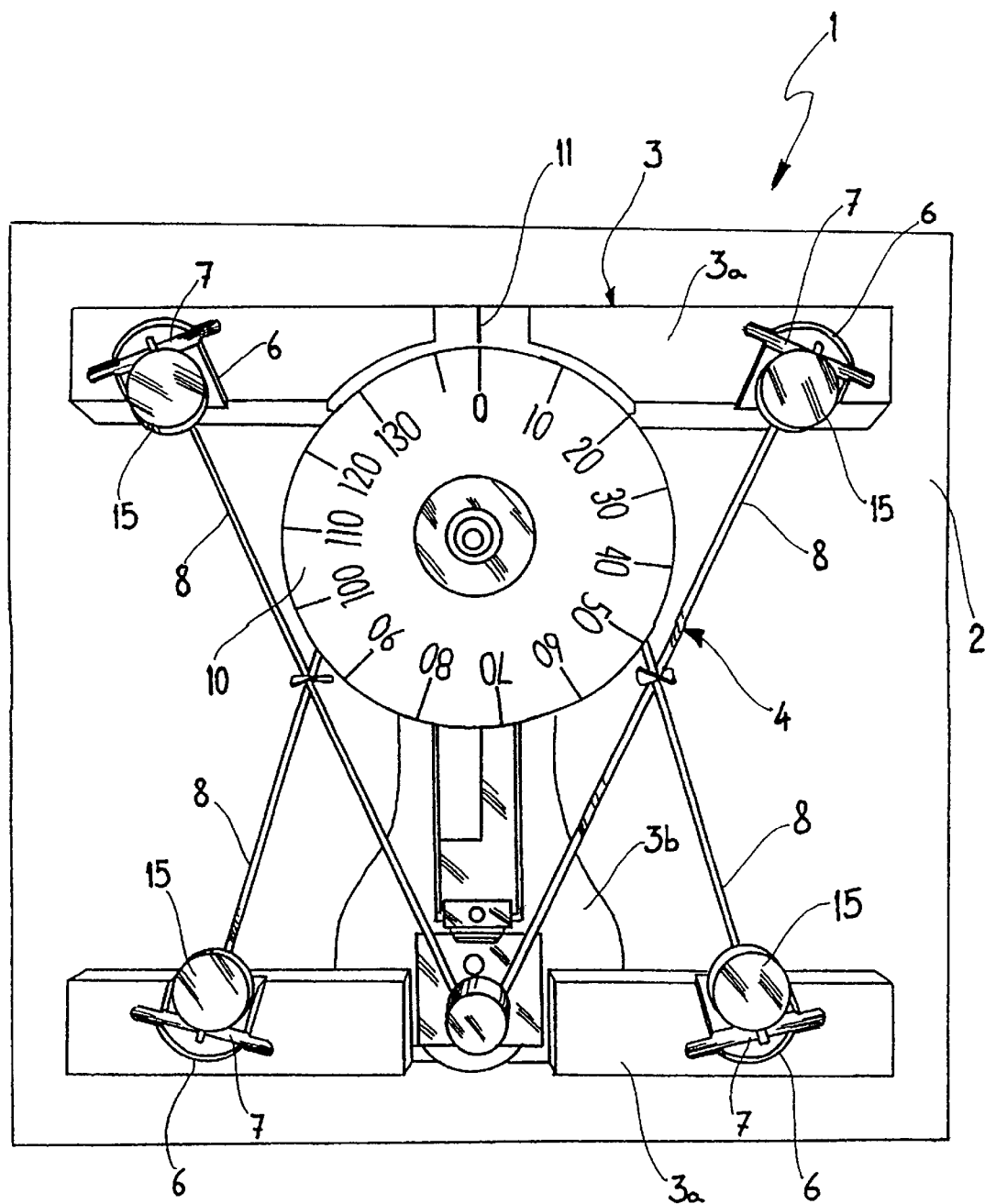
FIG. 1 is a plan view of scales according to the invention.

In the drawings, a set of personal weighing scales formed in accordance with the present invention is generally indicated 1.

The set of scales 1 comprises a load platform 2 formed by a transparent pane of glass which is substantially square in plan, a generally H-shaped frame 3, preferably made of wood and/or aluminium, and a weighing mechanism 4 with a conventional mechanical structure.

The frame 3 has two limbs 3a connected by a central portion 3b. At each end of each limb 3a there is a sunken seat 6 having two opposed recesses in which a pin or fulcrum 7 is disposed. The free end of an arm 8 of the weighing mechanism 4 of the scales bears on each pin 7. The mechanism is further equipped with a disk 10 which enables the weight measured to be displayed by means of a pointer 11.

Each arm 8 has, in the vicinity of its free end, a depression 12 on which a cylindrical fulcrum 13 bears, the fulcrum being fixed transversely through an appendage 15 which is glued or otherwise fixed to the lower surface (that facing the mechanism 4) of the load platform 2. In the conditions described above, the load platform 2 simply rests on the pins or fulcrums 7 of the frame 3. It is, however, necessary for the load platform and the frame to be connected to one another so that, if the scales 1 are gripped by the load platform 2, they can be lifted together therewith.

For this purpose, connection means are provided between the load platform and the frame. Whereas, in the scales according to the prior art, these connection means are formed by pairs of parallel rods, one extending between the appendages disposed on the same side of the central portion of the frame and the other fixed to the respective ends of the limbs of the frame, the rods being connected by means of a spring, in this embodiment, the connection means are formed by an elongate, rod-like element 16a or 16b which is inextensible (16a), or is extensible to a limited extent (16b) (FIG. 2 and FIGS. 3 to 6, respectively) and which extends between the fulcrum 13 or another engagement member, preferably fixed to the appendage 15, and a nail 17 or other engagement member fixed directly beneath the respective appendage in the frame 3. These connection means and their connection to the load platform and to the respective appendage are such as to prevent the load platform 2 from being detached from the frame 3 whilst allowing it to move towards the frame with a displacement at least equal to that resulting from the maximum permissible weighing on the load platform 2. Clearly, for geometrical reasons, the closer the blade 13 is to the end of the arm which bears on the pin 7, the smaller this displacement will be, and its magnitude is in any case so limited that it has substantially no effect, even when the elongate element 16a is substantially inextensible. In this embodiment, the aforementioned displacement is taken up by the play in the mounting of the element 16a and by the relative slimness of the element 16a which renders it deformable under axial load.

If the appendages 15 are formed with a small internal cavity, of which the drawings show a recessed portion 18 disposed astride the respective arm 8, the elongate element 16a, 16b, regardless of whether it is in the form of a hook of metal wire or strapping, or in the form of a helical spring, is preferably engaged on the portion of the fulcrum 13 which extends inside the corresponding appendage 15 so that the connection means are at least partially concealed in the corresponding appendages. Alternatively, as shown in FIG. 4, the fulcrum 13 may be arranged projecting laterally from the appendage 15, forming the engagement element with its projecting portion 19.

Figure 5:
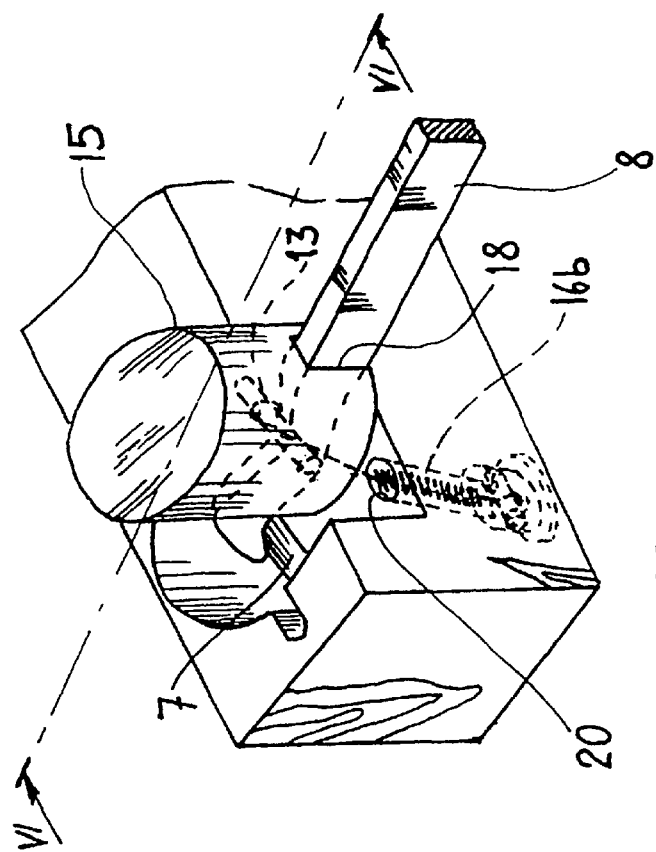
FIG. 5 is a third variant of the detail of FIG. 2.
Figure 6:
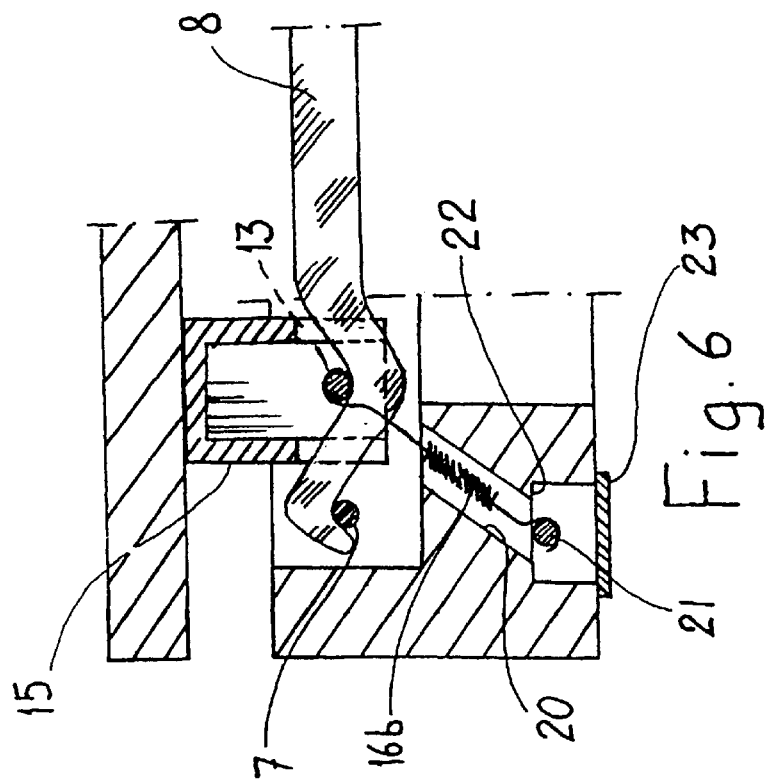
FIG. 6 is a schematic view of the same detail, sectioned on the line VI—VI of FIG. 5.

In the embodiment of FIGS. 5 and 6, for each appendage 15, the spring 16b is engaged on the fulcrum 13 at one end and is housed in a hole 20 extending through the limb 3*a* in order to engage, with its opposite end, a pin 21 or another catch element bearing against a shoulder 22 of the hole 20. The hole 20 in turn is closed at the bottom by a cap 23 which also has the function of supporting the frame 3 on the ground. The springs 16*b* are thus incorporated in the frame 3 so as to be almost completely invisible. The invention thus achieves the object set, providing a firm connection between the frame and the weighing platform without thereby altering the aesthetic lines or the correct operation of the scales, and without complicating the assembly thereof.

What is claimed is:

1. Improved personal weighing scales comprising a substantially transparent load platform (2), a mechanism (4) for measuring the load bearing on the platform, a frame (3) for supporting the mechanism support means (15) fixed to the load platform on the side facing the mechanism and bearing on the mechanism in order to transmit thereto the load bearing on the platform, the support means being in the form of appendages (15) projecting from the load platform (2) towards the mechanism (4), as well as connection means between the load platform (2) and the support frame (3), characterized in that the connection means comprise at least one elongate element (16*a*, 16*b*) having a first end connected to the frame (3) and a second, opposite end connected directly to the corresponding appendage (15), the connection means and their connection to the load platform and to the respective appendage being such as to prevent detachment of the load platform (2) from the frame (3).

2. Scales according to claim 1, in which each appendage (15) of the support means has an axial cavity in which a fulcrum (13) is fixed transversely so as to bear, by means of the appendage (15), on a respective arm (8) of the scales, the second end of the connection means engaging the fulcrum.

3. Scales according to claim 2, in which the connection means are engaged on the corresponding fulcrum (13) inside the cavity of the corresponding appendage (15) so as to be at least partially concealed in the cavity.

4. Scales according to claim 2, in which a portion of the fulcrum (13) projects from the corresponding appendage (15) and the second end of the connection means engage the projecting portion of the respective fulcrum (13).

5. Scales according to claim 1, in which the connection means are constituted by an elongate element (16*a*).

6. Scales according to claim 5, in which the element (16*b*) is resiliently extensible.

7. Scales according to claim 5, in which the elongate element (16*a*) is inextensible.

8. Scales according to claims 1, in which the load platform (2) is at least partially made of glass, and the appendages (15) are constituted by small cylinders glued to the load platform.

9. Scales according to claim 1 in which the frame (3) is made of wood and is at least partially visible through the load platform (2).

10. Scales according to claim 6, in which the elongate element (16*a*, 16*b*) is at least partially housed in a hole (20) in the frame and is anchored, by one of its ends, to the corresponding appendage and, by its opposite end, to a catch element (21) restrained in the hole (20).

11. Scales according to claim 10, in which the hole (20) extends through a corresponding limb (3*a*) of the frame (3) and a shoulder (22) is formed therein for restraining the catch element (21).

* * * * *